(12) United States Patent
Gicquel et al.

(10) Patent No.: US 10,585,528 B2
(45) Date of Patent: *Mar. 10, 2020

(54) SELF-SENSING TOUCH PANEL

(71) Applicant: STMicroelectronics Asia Pacific Pte Ltd, Singapore (SG)

(72) Inventors: Hugo Gicquel, Singapore (SG); Eng Jye Ng, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/014,664

(22) Filed: Jun. 21, 2018

(65) Prior Publication Data

US 2018/0300016 A1    Oct. 18, 2018

Related U.S. Application Data

(63) Continuation of application No. 15/199,792, filed on Jun. 30, 2016, now Pat. No. 10,031,620.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 3/0416* (2013.01); *G06F 2203/04101* (2013.01); *G06F 2203/04104* (2013.01)

(58) Field of Classification Search
CPC .... G06F 3/0412; G06F 3/0416; G06F 3/0418; G06F 3/044; G06F 2203/04101; G06F 2203/04104
USPC ...................... 178/18.01–19.07; 345/173–178
See application file for complete search history.

(56) References Cited

U.S. PATENT DOCUMENTS

| | | |
|---|---|---|
| 8,432,364 B2 | 4/2013 | Krah |
| 2013/0027338 A1 | 1/2013 | Nishimura et al. |
| 2015/0185914 A1 | 7/2015 | Han et al. |
| 2016/0124544 A1 | 5/2016 | Kang et al. |
| 2016/0124552 A1 | 5/2016 | Iwamoto et al. |
| 2016/0370926 A1 | 12/2016 | Lee |

*Primary Examiner* — Michael Pervan
(74) *Attorney, Agent, or Firm* — Seed IP Law Group LLP

(57) ABSTRACT

A method of differential self-capacitance measurement is used to enhance a signal-to-noise ratio of sense lines in a touch panel display, thereby improving touch sensor accuracy. The differential self-capacitance measurement is implemented for a touch panel using charge sharing between adjacent sense lines of the touch panel matrix. Sequential differential self-capacitance measurements can be compared with one another by computing the difference $|C_{S1}-C_{S2}|-|C_{S2}-C_{S1}|$ to sense a change caused by an intervening event. By scanning the entire touch panel matrix, events can be tracked across the touch panel.

19 Claims, 9 Drawing Sheets

SELF-SENSING TOUCH PANEL

BACKGROUND

Technical Field

The present disclosure relates to touch screen technology and, in particular, to improving the sensitivity of touch screens.

Description of the Related Art

Touch screens serve as user interfaces for many types of electronic devices in use today including, for example, smart phones, tablet computers, kiosks, vehicle control panels, and the like. A touch screen includes a touch-sensitive panel overlaid on a display. The display provides visual output to users of the electronic device. The display also presents text and graphics indicating selections, e.g., web links, play buttons, and the like, that can be activated by contact with the overlying touch-sensitive panel. Displays utilize various display technologies such as, for example, liquid crystals (LCD), plasma, organic light emitting diodes (OLED), and the like.

A touch-sensitive panel, or "touch panel," typically includes a matrix of drive lines and sense lines arranged transverse to one another and in planes that are separated from one another by a small distance. Sensor electrodes are placed at junctions where the drive lines cross the sense lines. The sensor electrodes may sense touch by a capacitive mechanism. When a finger comes into contact with the touch-sensitive panel at the electrode position, the capacitance of the finger increases the capacitance of the electrode with respect to ground. Detection of such an increase in "self-capacitance" therefore indicates a touch event. However, in some instances, touch events may be missed, or non-events may be misinterpreted as touch events. For example, certain touch panels may not be able to sense multiple touch events at the same time. Furthermore, a self-capacitance detection method may fail to sense a finger hovering above the touch panel. Water droplets falling on the touch panel may be erroneously interpreted as touch events. To improve accuracy in such instances, it is desirable to increase the signal-to-noise ratio of self-capacitance touch panels.

BRIEF SUMMARY

A method of differential capacitance measurement is used to enhance a signal-to-noise ratio of sense lines in a touch panel, thereby increasing touch sensor accuracy over methods that use absolute capacitance measurements. The differential capacitance measurement is a normalized electrical signal value that provides greater sensitivity to noise fluctuations. An increase in sensitivity occurs because differential measurement values are much smaller than absolute measurement values.

The differential capacitance measurement is implemented for a touch panel by using a charge sharing method to compare capacitance values on adjacent sense lines of the touch panel matrix. In a first step, the charge sharing method entails discharging a first sense line S1 while charging an adjacent second sense line S2. In a second step, the two sense lines are coupled so that they are at a common voltage in sharing the charge stored previously in the sense line S2. A differential capacitance measurement, $C_{S2}-C_{S1}$, can then be made comparing the common voltage of the two sense lines to a reference voltage. The sequence can then be reversed as is typically done when using a chopping technique. The first sense line is charged while the second sense line is discharged. After coupling the two sense lines, another differential capacitance measurement can be made comparing the common voltage of the two sense lines to a reference voltage, yielding $C_{S1}-C_{S2}$. Sequential differential capacitance measurements can then be compared with one another by computing the difference $|C_{S1}-C_{S2}|-|C_{S2}-C_{S1}|$ to sense a change caused by an intervening event. By scanning the entire matrix, events can be tracked across the touch panel.

DETAILED DESCRIPTION

Figure 1A:
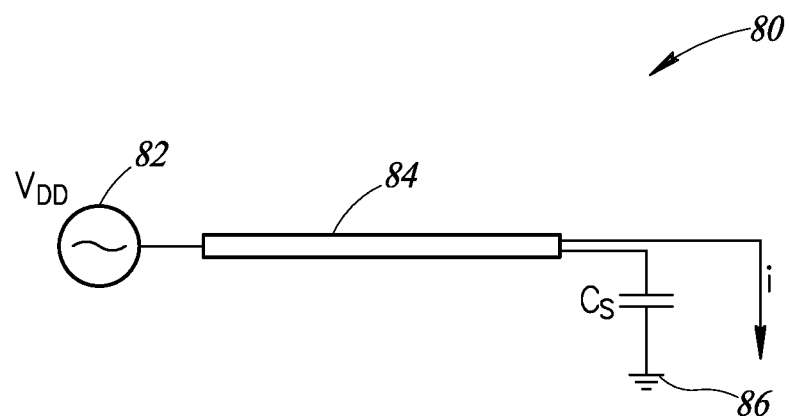
FIG. 1A is an electric circuit schematic of a self-capacitance sensing touch panel, according to an embodiment as described herein.

In the following description, certain specific details are set forth in order to provide a thorough understanding of various aspects of the disclosed subject matter. However, the disclosed subject matter may be practiced without these specific details. In some instances, well-known structures and methods comprising embodiments of the subject matter disclosed herein have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "In one embodiment" or "in an embodiment" in various places throughout the specification are not necessarily all referring to the same aspect. Furthermore, the particular features, structures, or characteristics may be combined in any suitable manner in one or more aspects of the present disclosure.

In the drawings, identical reference numbers identify similar elements or acts unless the context indicates otherwise. The sizes and relative positions of elements in the drawings are not necessarily drawn to scale.

Specific embodiments are described herein with reference to touch screens that have been produced; however, the present disclosure and the reference to certain materials, dimensions, and the details and ordering of processing steps are exemplary and should not be limited to those shown.

In the figures, identical reference numbers identify similar features or elements. The sizes and relative positions of the features in the figures are not necessarily drawn to scale.

Turning now to the drawings, FIG. 1A illustrates a self-capacitance sensor 80, according to an embodiment. The self-capacitance sensor 80, as part of a touch panel, is configured to detect a touch event, e.g., a finger contacting the touch panel. The self-capacitance sensor 80 includes an AC power supply 82 and a single touch panel electrode 84. A sense line capacitor $C_S$ represents a capacitance of the touch panel electrode 84. The self-capacitance sensor 80 detects touch events by monitoring the value of $C_S$ relative to a ground 86. There is no touch event occurring in FIG. 1A.

Figure 1B:
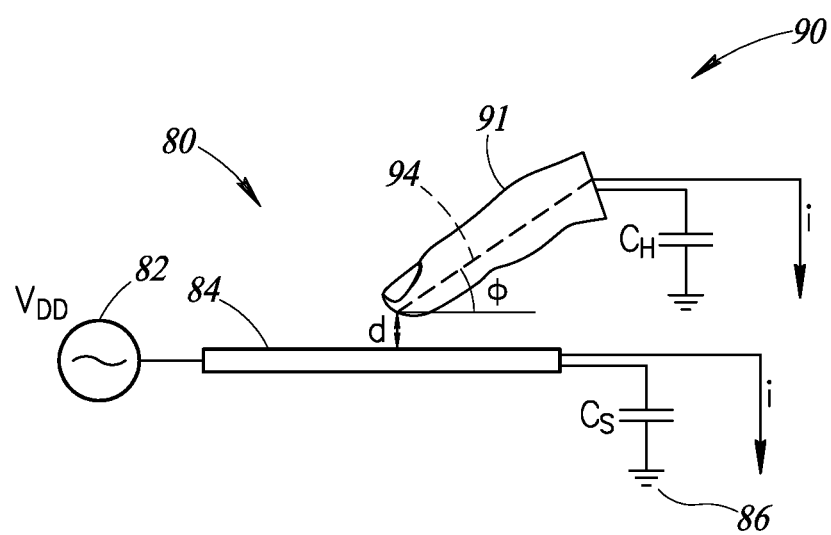
FIG. 1B is an electric circuit schematic of a self-capacitance sensing touch panel during a touch sensing event, according to an embodiment as described herein.

FIG. 1B illustrates a touch event 90 in which a human finger 91 is introduced, hovering a distance d above the touch panel electrode 84. The human finger 91 is aligned with an axis 94 oriented at an angle φ relative to the plane of the touch panel. The presence of the human finger 91 increases the capacitance of the touch panel electrode 84 relative to the ground 86. A capacitor $C_H$ represents a change in capacitance of the touch panel electrode 84 introduced by the human finger 91. Consequently, the self-capacitance sensor 80 is capable of sensing the hovering finger, in addition to sensing a finger in contact with the touch panel. Furthermore, the self-capacitance sensor 80 can distinguish between the human finger 91 and a water droplet that has landed on the touch panel, because a water droplet that is present on the touch panel changes the capacitance of the touch panel electrode 84, but by an amount that is different from the value of $C_H$. Other types of touch panel sensors, for example, mutual capacitance sensors that measure capacitance between a pair of electrodes, can detect contact with the touch panel. However, mutual capacitance sensors are not capable of detecting a hovering finger or providing a "water rejection" function.

Figure 2:
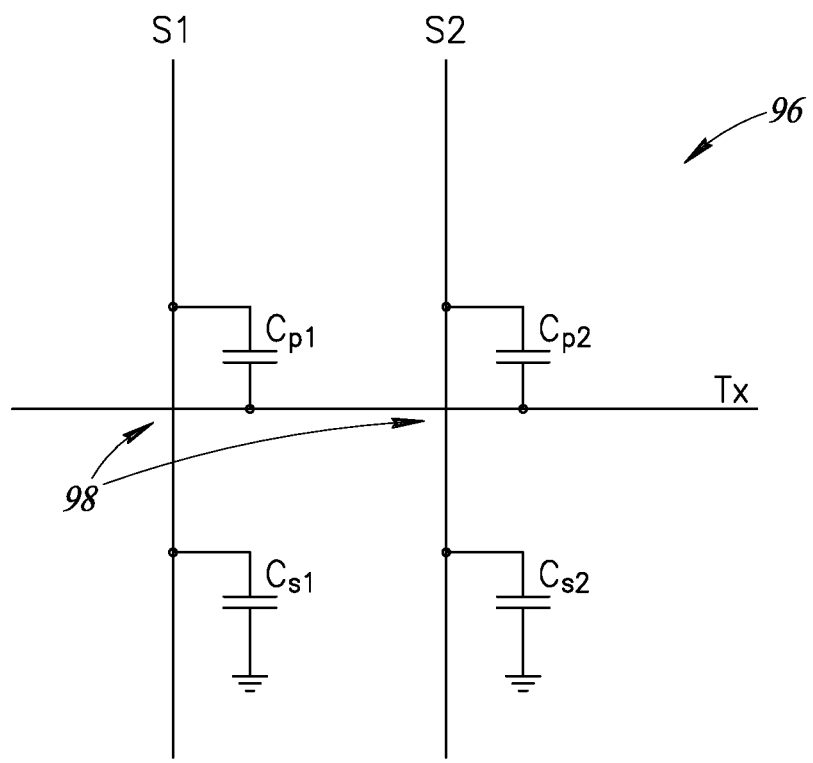
FIG. 2 is an electric circuit schematic showing junction capacitances of a touch screen, according to an embodiment as described herein.

FIG. 2 represents a portion of a self-capacitance-based touch panel 96, according to an embodiment of the present disclosure. The self-capacitance-based touch panel 96 is made of glass in which a matrix of drive lines $T_x$ and sense lines $S_x$ are formed as thin conductive wires embedded in the touch panel 96. Two examples of sense lines, S1 and S2, oriented vertically, and one example of a drive line $T_x$, oriented horizontally, are shown. In the full self-capacitance-based touch panel 96, there will be several dozens or hundreds of such lines $S_x$ and $T_x$. The sense lines $S_x$ cross over the drive lines $T_x$ at junctions 98, forming parallel plate capacitors in which the glass touch panel serves as the dielectric material separating the conductors. A touch controller applies drive signals to the drive lines $T_x$ and reads signals from the sense lines $S_x$. Consequently, there exists a panel capacitance $C_{px}$, between each sense line $S_x$ and the corresponding adjacent drive line $T_x$, wherein x=1, 2, and so on. In addition, when a touch event occurs, a self-capacitance $C_{sx}$ is created between each sense line $S_x$ and ground. When there is no touch event, the self-capacitance equals zero. The panel capacitances $C_{px}$ and the self-capacitances $C_{sx}$ are modeled as parallel-plate capacitors. Values of $C_{px}$ and $C_{sx}$ can be monitored by scanning and comparing neighboring sense lines $S_x$.

A hovering finger causes a small fluctuation in capacitance. In order to increase sensitivity to such small changes, a differential capacitance measurement $|C_{S1}-C_{S2}|$, can be made. In general, small changes are easier to detect using differential measurements than absolute measurements. This is because the fluctuations are large relative to the differential measurement values. Therefore, a differential capacitance measurement will be more sensitive to a touch event than an absolute capacitance measurement would be. A more sensitive measurement also improves noise performance by increasing the signal-to-noise ratio. That is, the ratio of differential signal and noise measurements will be larger than the ratio of absolute signal and noise measurements.

Figure 3:
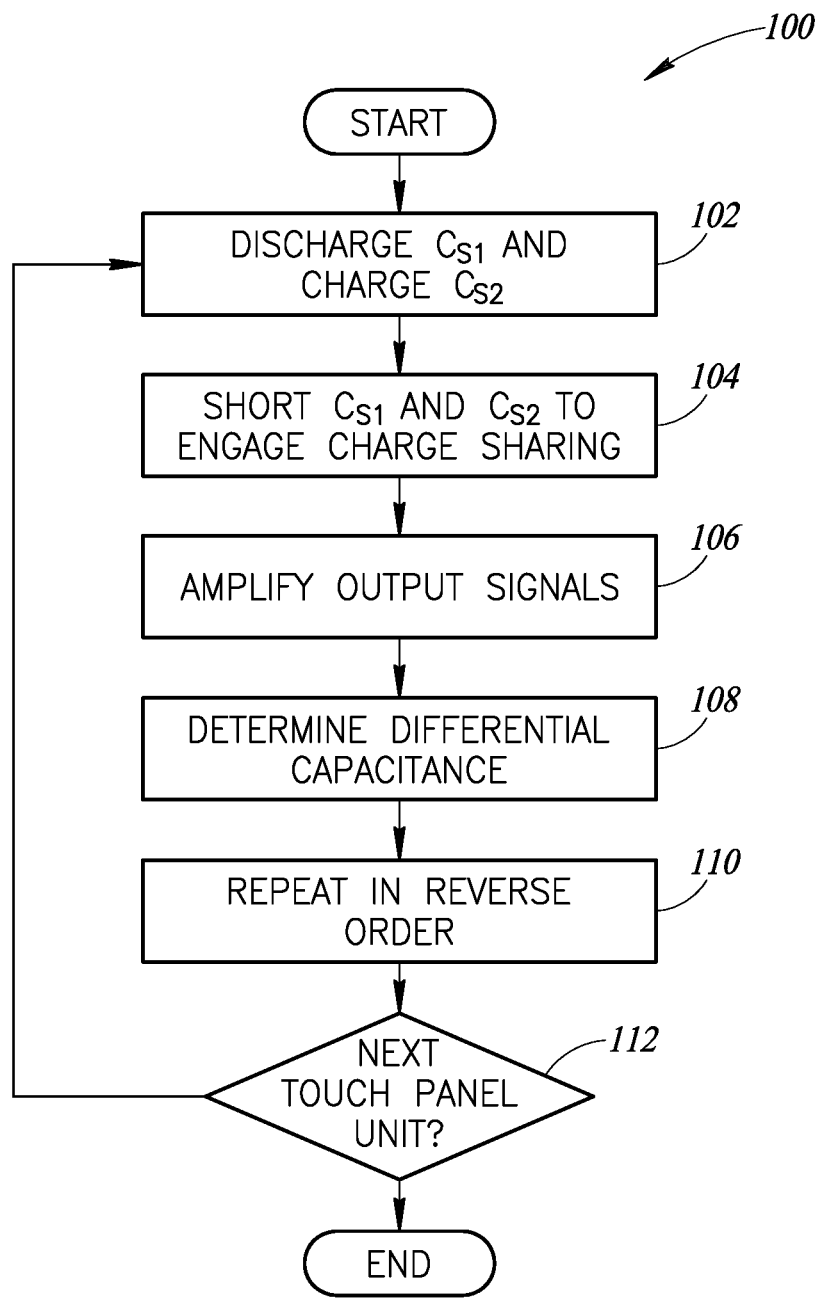
FIG. 3 is a flow diagram showing a sequence of steps in a method of operating a self-capacitance sensor according to an embodiment as described herein.

FIG. 3 shows steps in a method 100 of operating the self-capacitance based touch panel 96, according to an embodiment that incorporates a charge sharing technique to perform a scan sequence. The method 100 can be carried out by a self-mode charge sharing circuit 130 shown in FIG. 4A and described below. The method 100 is further illustrated by a timing diagram 160, shown in FIG. 4B, according to which the self-mode charge sharing circuit 130 is operated. The self-mode charge sharing circuit 130 can be used to recycle charge and, by doing so, reduce the demand for power while increasing sensitivity of a touch panel. Charge sharing is a well-known technique and has been used in many areas of electrical design, including low-power digital CMOS circuits, LCD display drivers, and touch sensor panels, for example, as disclosed in U.S. Pat. No. 8,432,364. It is shown herein that charge sharing can be used to facilitate sensing differential self-capacitance of a touch screen associated with a touch event.

Figure 4A:
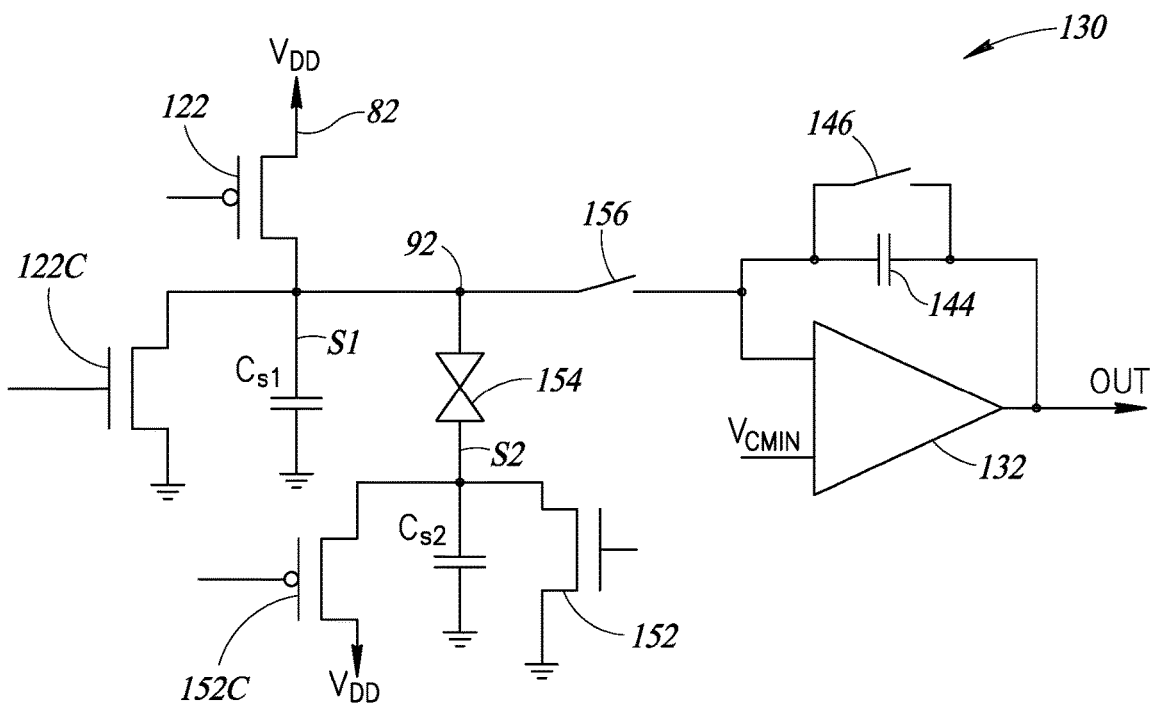
FIG. 4A is an electric circuit schematic of a charge sharing circuit with amplification, according to an embodiment as described herein.

The self-mode charge sharing circuit 130 shown in FIG. 4A includes an output buffer 132 coupled to parallel capacitors $C_{S1}$ and $C_{S2}$ by switches 154 and 156. The switch 154, in particular, acts as charge sharing switch, represented by a bow-tie symbol in FIG. 4A. The charge sharing switch 154 is used to share charge between the two sense lines S1 and S2. Switch 154 permits charge sharing by coupling $C_{S1}$ and $C_{S2}$ to one another. The switch 156 then couples the sense lines $S_1$ and $S_2$ to the output buffer 132. The switches 154, 156 can be, for example, standard CMOS transistor gates, or transmission gate switches made from pairs of CMOS transistor gates, as is known in the art.

In an embodiment, the output buffer 132 is an operational amplifier (op-amp) buffer. The output buffer 132 functions as a differential amplifier that applies a gain factor to the difference between the voltages at the two input terminals, $V_{Cmin}$ and the voltage at node 92. A reference capacitor 144 is connected in the feedback loop of the output buffer 132. The reference capacitor 144 is an internal reference capacitor that can be bypassed by closing a switch 146. Transistor 122 couples $C_{S1}$ to the power supply $V_{DD}$ to charge $C_{S1}$. $V_{DD}$ may be a standard supply voltage within the range of about 3.3 V-12 V. Transistor 152 bypasses $C_{S2}$ or connects node 92 directly to ground to discharge $C_{S2}$. The self-mode charge sharing circuit 130 monitors self-capacitance associated with the sense lines $S_1$ and $S_2$, respectively, according to the timing diagram shown in FIG. 4B.

Figure 4B:
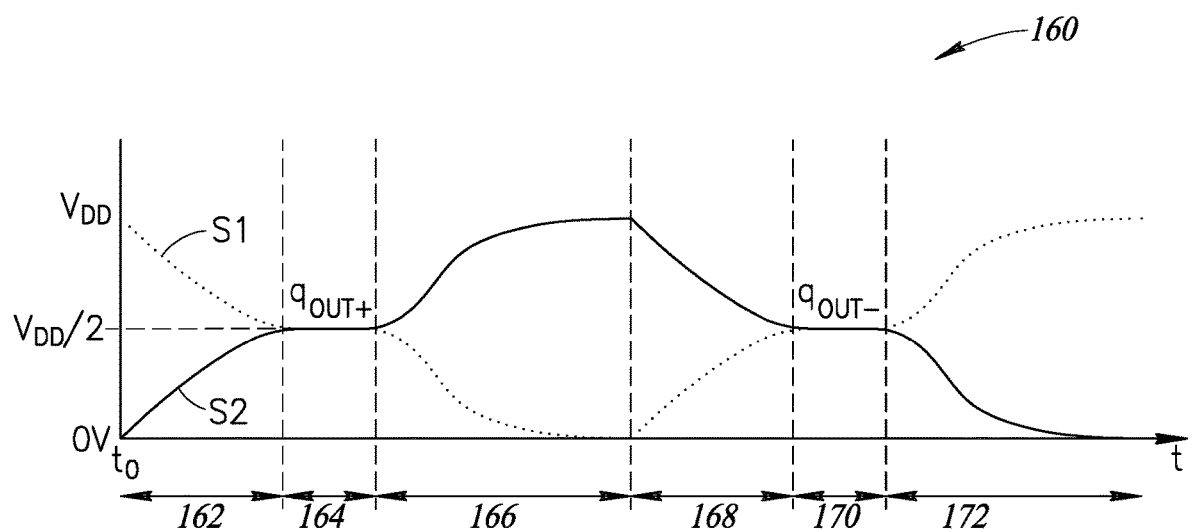
FIG. 4B is a timing diagram of electric charge on sense lines S1 and S2 during operation of the charge sharing circuit shown in FIG. 4A.

At 102, at an initial time $t_0$ in the method 100, the transistors 122 and 152 are on, so that the capacitor $C_{S1}$ is set to the voltage $V_{DD}$ and is charged to $q_{in}=C_{S1}*V_{DD}$, while the capacitor $C_{S2}$ is discharged and is at 0 V, as shown in FIG. 4B.

At 104, charge sharing is engaged. The transistors 122, 122C, 152, and 152C are turned off and switch 154 is closed so that sense lines $S_1$ and $S_2$ are shorted together at node 92. During an initial time interval 162, the capacitor $C_{S1}$ begins discharging while the capacitor $C_{S2}$ begins charging. By the end of the time interval 162, S1 and S2 are at approximately the same voltage, e.g., $V_{DD}/2$.

At 106, the switch 146 is turned off and the switch 156 is closed. During an amplification period coinciding with time interval 164, a portion of the charge shared by $C_{S1}$ and $C_{S2}$ is transferred to the capacitor 144, as is typical in a switched capacitor circuit.

At 108, at the end of the time interval 164, a differential capacitance $|C_{S1}-C_{S2}|$ is determined by extracting the transferred charge, $q_{out}+$. Using, for instance, $V_{CMIN}=V_{DD}/2$ and $q_{out}+=V_{DD}/2(C_{S1}-C_{S2})$, then the equation $V_{OUT}-V_{DD}/2=V_{DD}/2(C_{S2}-C_{S1})$ can be used to compute the differential capacitance $|C_{S1}-C_{S2}|$. Computations can be carried out by a microprocessor and an associate 22d memory that are part of the touch screen controller.

At 110, the process can be reversed, as is usual in a chopped circuit to improve flicker noise rejection. During the time interval 166, the switch 146 is opened to reset the previous value of the output signal, and the transistors 122C, 152C are turned on so that S1 is discharged to 0 V and S2 is pre-charged to $V_{DD}$. Then the transistors 122C, 152C are turned off and the two sense lines S1 and S2 are shorted together so that $C_{S2}$ discharges while $C_{S1}$ charges to a common voltage during the time interval 168. During an amplification and charge sharing time interval 170, charge is equalized on the two capacitors $C_{S1}$ and $C_{S2}$. Switches 146 and 154 are closed during time interval 170, permitting the charge $q_{out}-$ to be transferred by the output buffer 132. A differential capacitance $|C_{S2}-C_{S1}|$ can then be computed at the end of the time interval 170 by extracting the amplified charge, $q_{out}-$ and using the equation $q_{out}+=V_{DD}/2(C_{S2}-C_{S1})$ when $V_{CMIN}=V_{DD}/2$. During a final time interval 172, the charge sharing switch 154 is opened and the capacitor $C_{S2}$ is discharged while $C_{S1}$ is restored to the supply voltage $V_{DD}$.

The differential capacitance measurements that are made at the end of the charge transfer intervals 164, 170 can be made by sampling using an A-to-D converter. By monitoring differential capacitance values over time and across the touch panel, a touch event can be detected by the disturbance that the touch event creates in the value of the differential capacitance.

At 112, the method 100 can be repeated to monitor an adjacent pair of sense lines, and so move across the touch panel in a serial fashion. Alternatively, the method 100 can be carried out in parallel by replicating the self-mode charge sharing circuit 130 to monitor a plurality of pairs of sense lines simultaneously.

FIGS. 5A-5D illustrate various charge sharing scan sequences involving up to five sense lines S1-S5, or channels, as examples. There may be 32 channels, for example, or any arbitrary number of channels. Each instance of charge sharing indicated by a solid line bow-tie switch 154 represents execution of the method 100 described above. A dotted line bow-tie switch indicates an open switch. The number of sense lines being scanned depends on the size of the touch screen.

Figure 5A:
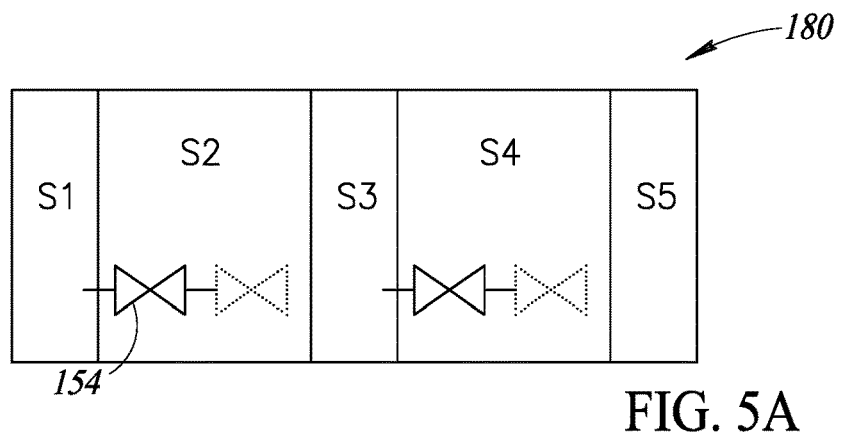
FIGS. 5A-5B show operations occurring in a charge sharing differential self-mode used to scan odd numbered sense lines, according to an embodiment as described herein.
Figure 5B:
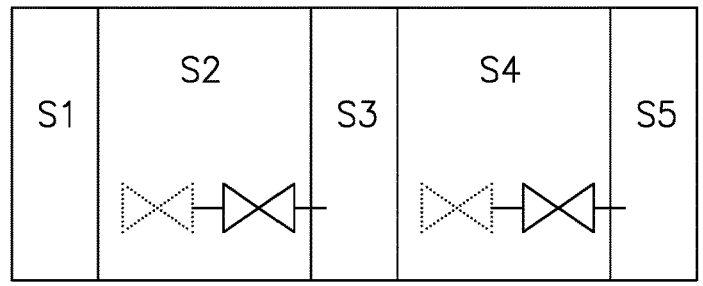
Figure 5C:
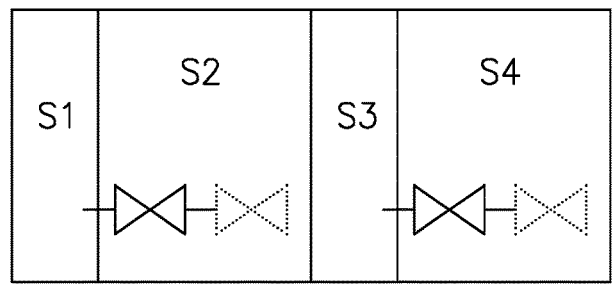
FIGS. 5C-5D show operations occurring in a charge sharing differential self-mode used to scan even numbered sense lines, according to an embodiment as described herein.
Figure 5D:
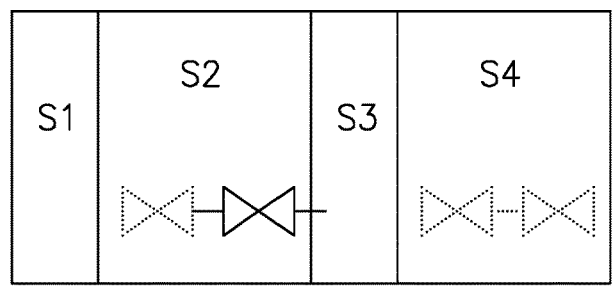

In a first scan shown in FIG. 5A, charge sharing is applied to sense lines S1 and S2 to determine the differential capacitance $|C_{S2}-C_{S1}|$ and to sense lines S3 and S4 to determine a differential capacitance $|C_{S3}-C_{S4}|$. In a second scan shown in FIG. 5B, charge sharing is applied to sense lines S2 and S3 to determine a differential capacitance $|C_{S2}-C_{S3}|$ and to sense lines S4 and S5 to determine a differential capacitance $|C_{S4}-C_{S5}|$. In a third scan shown in FIG. 5C, charge sharing is applied to sense lines S1 and S2 to determine the differential capacitance $|C_{S1}-C_{S2}|$ and to sense lines S3 and S4 to determine the differential capacitance $|C_{S3}-C_{S4}|$. In a fourth scan shown in FIG. 5D, charge sharing is applied to sense lines S2 and S3 to determine the differential capacitance $|C_{S2}-C_{S3}|$.

Figure 6A:
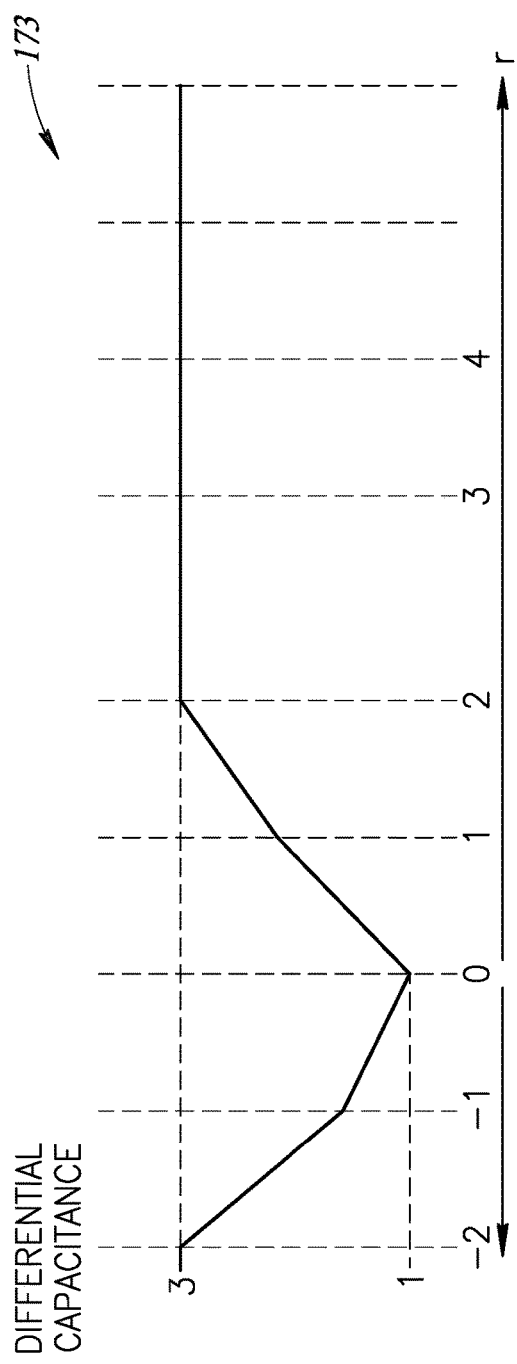
FIG. 6A is a differential capacitance profile for a charge-sharing self-mode, according to an embodiment as described herein.
Figure 6B:
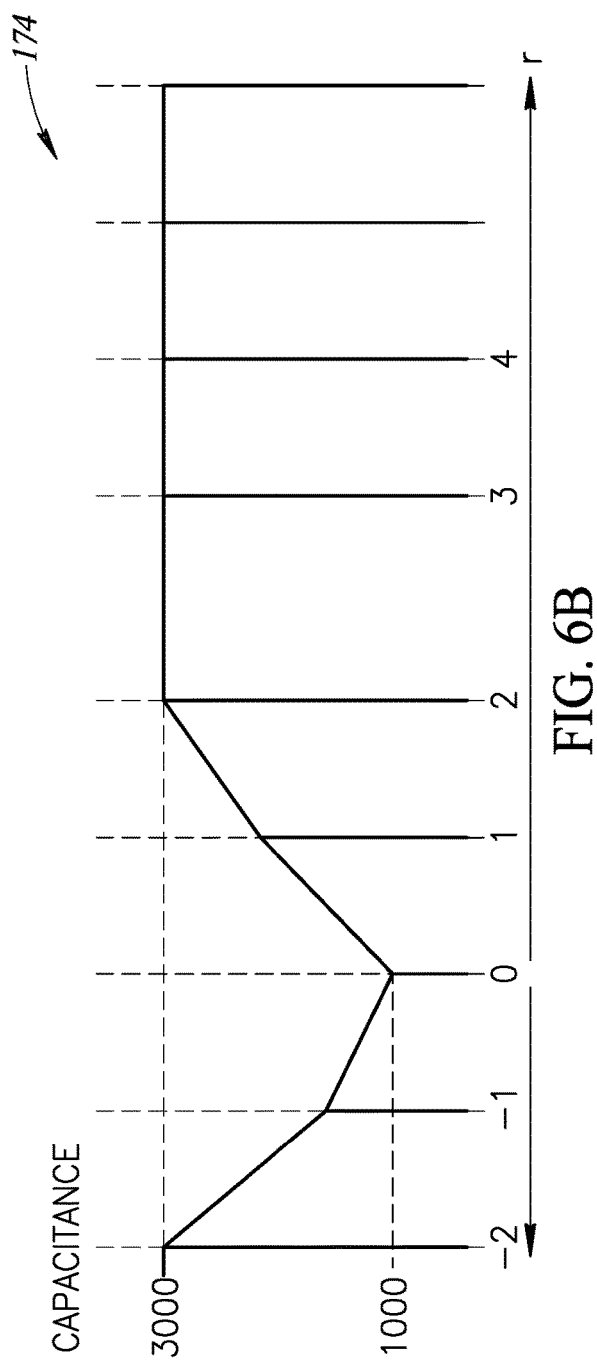
FIG. 6B is a plot of a conventional, normalized signal value capacitance profile.

FIGS. 6A and 6B compare differential capacitances with absolute capacitances determined during a touch event. The touch event occurs at the origin (0) and is measurable out to about two radial units away from the touch site. Values of absolute capacitance 174 obtained for the example shown in FIG. 6B are about 1000 times greater than corresponding normalized differential capacitance measurements 173 shown in FIG. 6A.

FIGS. 7-12 show variations of the self-mode charge sharing circuit 130 in which panel capacitances $C_{P1}$ and $C_{P2}$ are taken into account. FIGS. 7-12 therefore include the addition of panel capacitor $C_{P1}$ in parallel with $C_{S1}$, panel capacitor $C_{P2}$ in parallel with $C_{S2}$, and an error cancellation stage CX. The error cancellation stage CX is used to cancel out charge on the capacitors $C_{P1}$, $C_{P2}$ so it will not affect the charge measurements $q_{out}+$ and $q_{out}-$ associated with self-capacitance during a touch event. The error cancellation stage CX is a switching capacitor circuit that includes a capacitor and a driver that can remove charge from the S2 line, thereby compensating for error introduced by the differential capacitance $|C_{P1}-C_{p2}|$.

Figure 7:
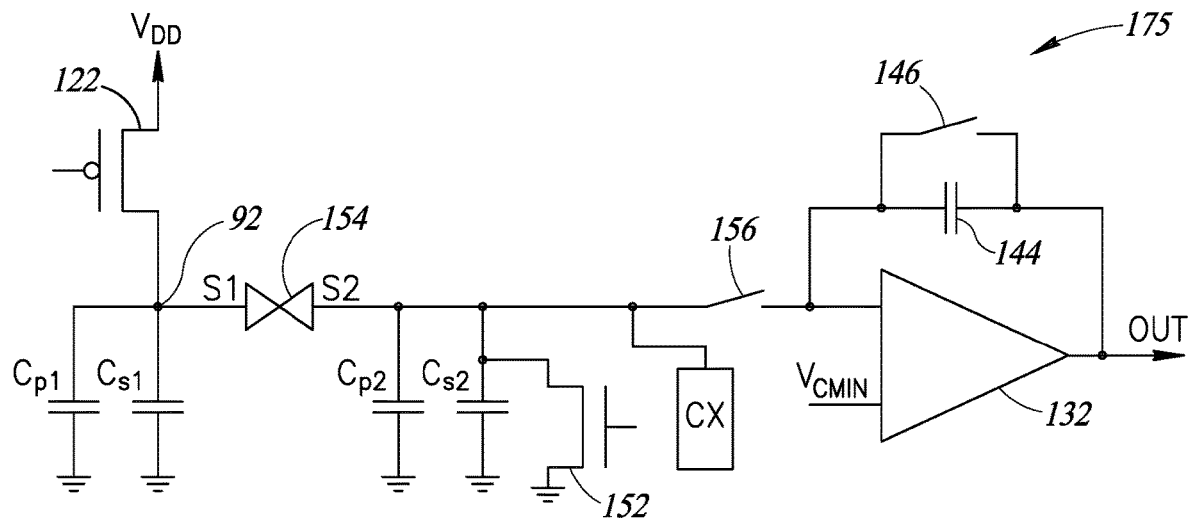
FIGS. 7-11 are electric circuit schematics for a touch panel implementing a charge sharing differential self-mode, according to various embodiments as described herein.

FIG. 7 shows a low-power self-mode circuit 175, according to an embodiment of the present disclosure. The low-power self-mode circuit 175 can be substituted for the self-mode charge sharing circuit 130 when the touch panel is in "wake-up" mode following an idle period. In use, the power supply $V_{DD}$ for the low-power self-mode circuit 175 is set to 3.3 V and the $V_{CMIN}$ input to the output buffer 132 is then 3.3 V/2=1.65 V. Due to charge sharing, the voltages used in the self-mode circuits described herein are low, and therefore error cancellation occurs quickly and efficiently. Use of the low-power self-mode circuit 175 also incurs less noise than a conventional touch panel circuit that detects capacitance instead of differential capacitance.

Figure 8:
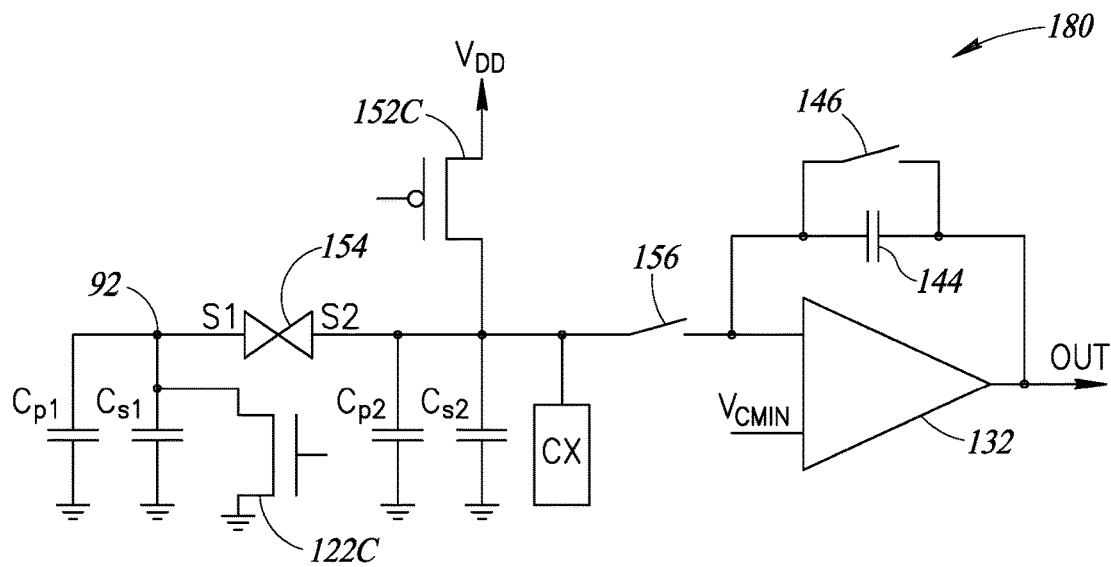

FIG. 8 shows a low-power self-mode circuit 180, according to an embodiment. The low-power self-mode circuit 180 is also intended for use, for example, when the touch panel is in "wake-up" mode following an idle period. The low-power self-mode circuit 180 is a complimentary, reverse circuit corresponding to the low-power self-mode circuit 175 in which the power supply $V_{DD}$ and the transistor 122 are coupled to the sense line S2, and the transistor 152 is coupled to the sense line S1. As explained above, the low-power self-mode circuit 180 can be used in conjunction with a chopping technique. In use, the power supply $V_{DD}$ for the low-power self-mode circuit 180 is set to 3.3 V and the $V_{CMIN}$ input to the output buffer 132 is then $V_{DD}/2=1.65$ V.

Figure 9:
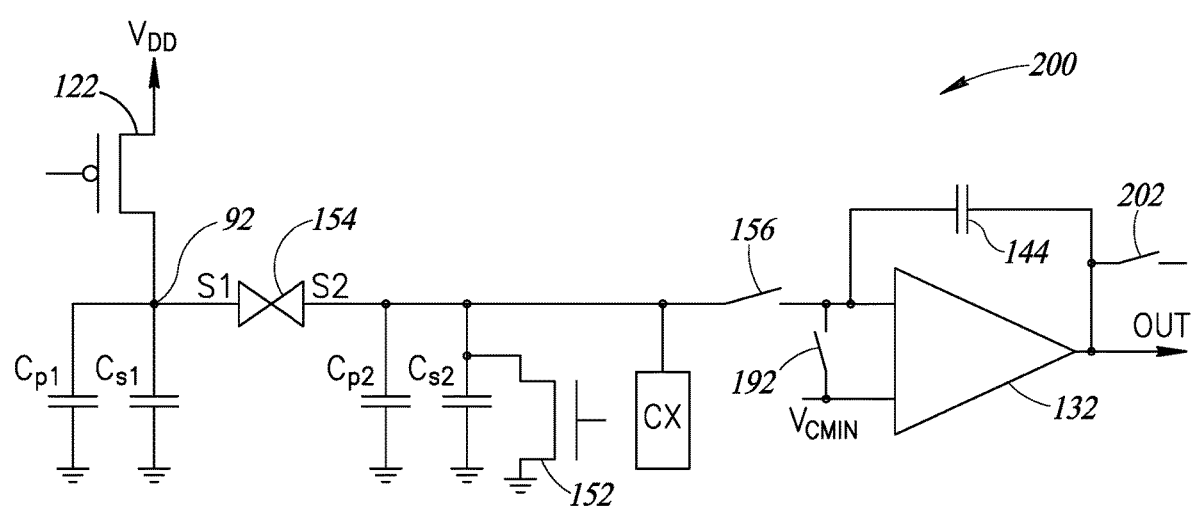

FIG. 9 shows a self-mode circuit 200, according to an embodiment of the present disclosure. The self-mode circuit 200 is intended for use during normal operation of the touch panel and provides for cancellation of the differential panel capacitance for a faster scan. The self-mode circuit 200 resembles the self-mode circuit 175 except that a switch 202 has been added to the output of the output buffer 132, the switch 146 has been removed from the feedback loop of the output buffer 132, and a switch 192 has been added between the inputs of the output buffer 132. As is usual in a switched capacitor circuit, such components permit discrimination between the output and the input common mode of the operational amplifier 132. In use, the power supply $V_{DD}$ for the self-mode circuit 200 is set to 5.0 V and the $V_{CMIN}$ input to the output buffer 132 is then $V_{DD}/2=2.5$ V. In addition, the switch 202 couples to a 1.65 V power supply.

Figure 10:
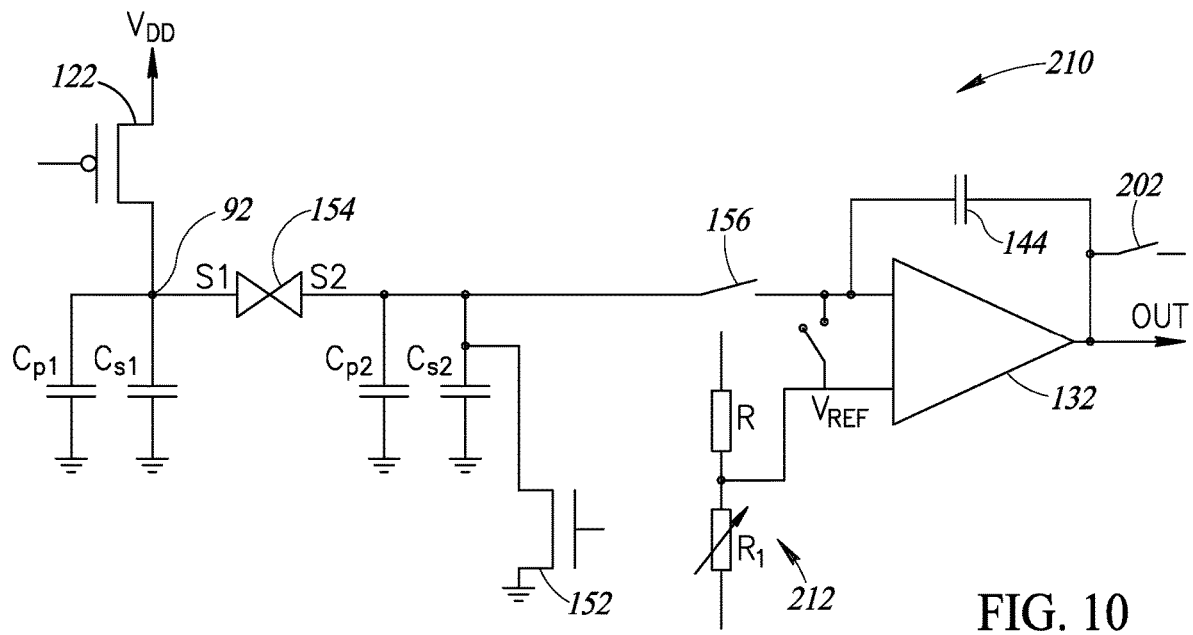

FIG. 10 shows a self-mode circuit 210, according to an embodiment of the present disclosure. The self-mode circuit 210 is intended for use during normal operation of the touch panel, and provides an alternative to differential $C_p$ cancellation. The self-mode circuit 210 resembles the self-mode circuit 200 except that the error cancellation stage CX has been removed and a tunable voltage divider 212 is used to generate a reference voltage, $V_{ref}$. In use, the power supply $V_{DD}$ for the self-mode circuit 210 is set to 5.0 V and the $V_{ref}$ input to the output buffer 132 is then $V_{DD}/2=2.5$ V. In place of the error cancellation stage CX, $V_{ref}$ is coupled to the voltage divider 212 that includes a resistance R coupled to an intermediate power supply $V_{dd}$ and a variable resistance R1. $V_{DD}$ may be set to 3.3 V, for example.

Figure 11:
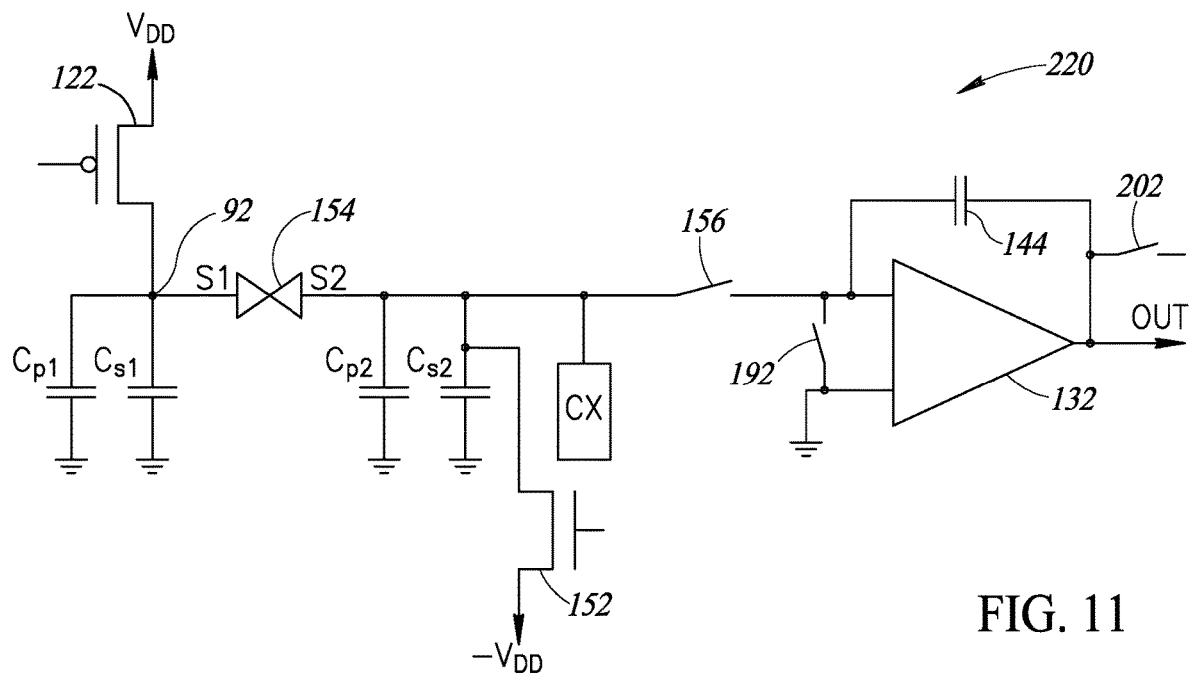

FIG. 11 shows a self-mode circuit 220, according to an embodiment of the present disclosure. The self-mode circuit 220 is intended for use during normal operation of the touch panel. The self-mode circuit 210 resembles the self-mode circuit 200 shown in FIG. 11 except that the transistor 152 is connected to a negative voltage instead of being grounded. In use, the power supply $V_{DD}$ for the self-mode circuit 220 is set to 5.0 V and the VCMIN node is effectively the ground. In addition, the switch 202 couples to a 1.65 V power supply.

All of the U.S. patents, U.S. patent application publications, U.S. patent applications, foreign patents, foreign patent applications and non-patent publications referred to in this specification and/or listed in the Application Data Sheet are incorporated herein by reference, in their entireties.

It will be appreciated that, although specific embodiments of the present disclosure are described herein for purposes of illustration, various modifications may be made without departing from the spirit and scope of the present disclosure. The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit, comprising:
   an output buffer having a first input, a second input and an output;
   a first sense line capacitor coupled to a power supply node via a first switch configured to be turned on during a first time period to charge the first sense line capacitor;
   a second sense line capacitor coupled to a ground node via a second switch configured to be turned on during the first time period to discharge the second sense line capacitor;
   a first charge sharing switch in line between the first and second sense line capacitors and configured to be turned on during a second time period, after the first time period, to engage the first and second sense line capacitors in charge sharing;
   a second charge sharing switch coupled between the first sense line capacitor and the first input of the output buffer and configured to be turned on during a third first time period, after the second time period, to couple to the first sense line capacitor to the output buffer, the output buffer being configured to receive a reference voltage at the second input, compare a common voltage sensed at the first sense line capacitor with the reference voltage, and output a voltage representative of a difference between the common voltage and the reference voltage to determine a location on a touch panel where a finger is adjacent to the touch panel; and
   a tunable voltage divider coupled to the second input and configured to output the reference voltage to the second input.

2. The circuit of claim 1, wherein the output buffer includes an operational amplifier having two input terminals.

3. The circuit of claim 2, wherein the output buffer further comprises a reference capacitor in a feedback loop of the operational amplifier.

4. The circuit of claim 3, further comprising
   a first panel capacitor coupled in parallel with the first sense line capacitor; and
   a second panel capacitor coupled in parallel with the second sense line capacitor.

5. The circuit of claim 2, wherein the output buffer is further equipped with an input switch that optionally couples the two input terminals of the operational amplifier.

6. The circuit of claim 5, further comprising:
   a bypass switch configured to optionally remove the reference capacitor from a feedback loop.

7. The circuit of claim 2, wherein the two input terminals of the operational amplifier are coupled to one another and the output buffer further comprises an output switch in the feedback loop.

8. The circuit of claim 3, wherein one of the terminals of the operational amplifier is a ground terminal.

9. The circuit of claim 1, wherein the touch panel is a component of a mobile electronic device.

10. A circuit, comprising:
    an output buffer having a first input, a second input and an output;
    a first sense line capacitor coupled to a power supply node via a first switch configured to be turned on during a first time period to charge the first sense line capacitor;
    a second sense line capacitor coupled to a ground node via a second switch configured to be turned on during the first time period to discharge the second sense line capacitor;
    a first charge sharing switch in line between the first and second sense line capacitors and configured to be turned on during a second time period, after the first time period, to engage the first and second sense line capacitors in charge sharing;
    a second charge sharing switch coupled between the first sense line capacitor and the first input of the output buffer and configured to be turned on during a third first time period, after the second time period, to couple to the first sense line capacitor to the output buffer, the output buffer being configured to receive a reference voltage at the second input, compare a common voltage sensed at the first sense line capacitor with the reference voltage, and output a voltage representative of a difference between the common voltage and the reference voltage to determine a location on a touch panel where a finger is adjacent to the touch panel; and an input switch coupled between the first input and the second input and configured to transition between a conductive state in which the first and second inputs are coupled to each other and a non-conductive state in which the first and second inputs are decoupled from each other.

11. The circuit of claim 10, wherein the output buffer includes an operational amplifier and a reference capacitor in a feedback loop of the operational amplifier.

12. The circuit of claim 11, wherein one of the terminals of the operational amplifier is a ground terminal.

13. The circuit of claim 10, further comprising
a first panel capacitor coupled in parallel with the first sense line capacitor; and
a second panel capacitor coupled in parallel with the second sense line capacitor.

14. The circuit of claim 10, wherein the touch panel is a component of a mobile electronic device.

15. A method comprising:
discharging a first sense line capacitor of a touch panel;
charging a second sense line capacitor of the touch panel;
coupling the first and second sense line capacitors to one another to engage charge sharing;
determining a differential self-capacitance;
outputting, by a tunable voltage divider, a reference voltage;
comparing a common voltage of the first and second sense line capacitors with the reference voltage;
repeating the steps of discharging, charging, coupling, determining, outputting, and comparing for a plurality of first and second sense line capacitors of the touch panel; and
determining, from changes in the differential self-capacitance measurements, a location on the touch panel where a finger is adjacent to the touch panel.

16. The method of claim 15, comprising:
discharging the first sense line capacitor;
charging the second sense line capacitor;
coupling the first and second sense line capacitors to one another to engage charge sharing;
determining a differential capacitance measurement to compare capacitances of the first and second sense line capacitors; and
amplifying output signals of the sense line capacitors.

17. The method of claim 15, comprising:
amplifying signals of the first and second sense line capacitors using an operational amplifier.

18. The method of claim 15, wherein the discharging is accomplished by grounding the second sense line capacitor.

19. The method of claim 15, wherein charging the sense line capacitor includes coupling the sense line capacitor to a power supply in a range of 3.3V-12 V.

* * * * *